June 24, 1969 J. E. NYBERG 3,451,416
RELIEF VALVES
Filed Dec. 1, 1966
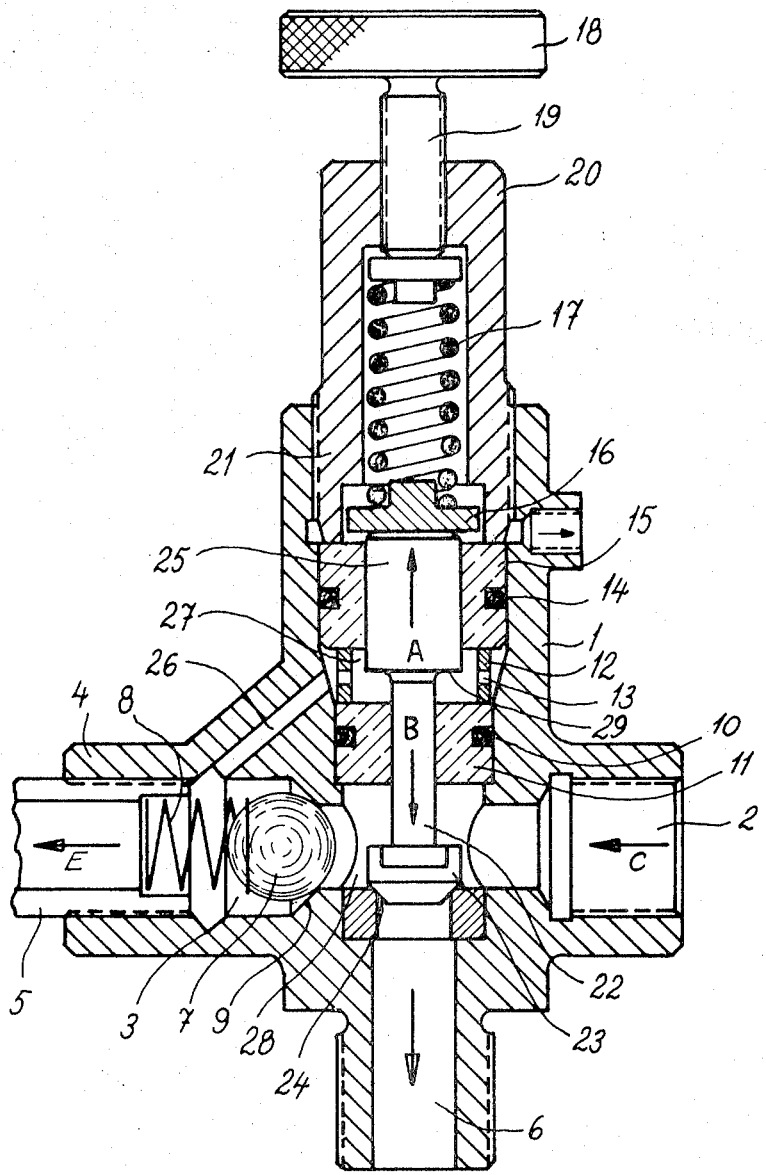

United States Patent Office 3,451,416
Patented June 24, 1969

3,451,416
RELIEF VALVES
Johan Edvard Nyberg, Kiruna, Sweden, assignor to
Nybergs Mekaniska Verkstab AB, Kiruna, Sweden
Filed Dec. 1, 1966, Ser. No. 598,408
Claims priority, application Sweden, Dec. 13, 1965,
16,156/65
Int. Cl. G05d 7/00, 9/00, 11/00
U.S. Cl. 137—108                                1 Claim

ABSTRACT OF THE DISCLOSURE

An arrangement for unloading valves by which the valves can be adjusted manually by regulating a spring so that immediately upon exceeding a certain load in the pressure system determined by the force of the spring, the valve immediately cuts off all communication with said system and automatically opens a shunt line through which pressure medium, which is supplied constantly to the valve, is lead away in a depressurized condition to a reservoir.

---

The present invention relates to an arrangement in hydraulic relief valves of the type which discharge the pressure medium through a non-return valve and which present a by-pass outlet provided with a gate valve operated, via a pressure piston which is actuated in one direction by the pressure downstream of the non-return valve and in the opposite direction by adjustable spring means, by the difference in pressure between the spring means and the pressure exerted by the medium downstream of the non-return valve.

The invention relates in particular to a hydraulic relief valve which when the set maximum pressure is reached abruptly opens out into a side outlet, usually leading to a tank.

Common, present day relief valves are provided with a ball or cone shaped member which is spring loaded to a pressure corresponding to the required maximum pressure. When this pressure has been reached the pressure medium is forced with a high degree of friction through a gap, the majority of the pressure energy produced by the pump being converted into thermal energy, which is lost and results in deleterious heating of the pressure medium—usually oil.

The object of the invention is to eliminate this and other disadvantages and is mainly characterized in that the piston is firmly connected with the gate valve member by means of a piston rod which is capable of sealingly projecting through the wall of the valve housing, the end of the piston facing the gate valve member being actuated upon by the pressure of said medium and the other end of said piston by a coil spring, the strength of which can be adjusted by manual setting means, the effective, pressure-loaded surface of the gate-valve member being smaller than that of the opposing, effective pressure surface of the piston to such an insignificant extent that the characteristics of the spring permit easy and convenient manual adjustment of the spring pressure.

The invention will now be described with reference to an embodiment of the same, shown diagrammatically in the accompanying drawing, additional characterizing features of the invention also being shown.

The drawing shows in vertical section a relief valve according to the invention.

The reference numeral 1 in the figure indicates a valve housing provided with an inlet 2 for a hydraulic pressure medium arriving from a pump or some other source of pressure medium to be used for work in some machine or apparatus. Further, the reference numeral 3 indicates an outlet for the pressure medium, which outlet by means of a stub-pipe 4 can be connected via a main-flow conduit 5 to said working machine, apparatus or the like, such as piston cylinders working with a hydraulic medium. The valve housing also presents an outlet 6, located on the side of said housing and which is intended to be connected to an over-flow tank for pressure medium.

A non-return valve, in this case shown as a ball valve 7, is arranged in the main flow conduit, between the inlet 2 and the outlet 3 and actuated by a suitable coil spring 8 in such a way that the valve is held in sealing abutment with an inner seating 9 in the valve housing. Further, a lower sleeve 11 is sealingly fitted, by means of an O-ring 10, in the said valve housing. Seated on top of said sleeve is a sleeve-forming ring 12 provided with a convenient number of through-flow holes 13, the purpose of which will be explained later. Situated above the sleeve ring 12 is a further sleeve 15 equally as closely fitted as sleeve 11 and provided with a seal, e.g. an O-ring 14, a so-called abutment plate 16 being positioned above said sleeve 15 and pressed downwards by means of a coil spring 17, the tension of which can be adjusted by means of a knob 18 mounted on a threaded bolt 19 which is screwed into an upper cap 20 which belongs to the valve housing and which is screwed into the same by means of threads 21. A piston rod 22 passes longitudinally through the valve housing and supports at its lower end a valve cone or the like 23 cooperating with a valve seating 24. The upper portion of the piston rod 22 supports a piston head 25, slidably working in a corresponding bore in the sleeve 15. The piston rod is capable of being displaced alternately in the direction of arrows A and B.

It may also be mentioned that the main flow conduit 5 downstream of the non-return valve or ball valve 7 communicates, through a channel 26, via the holes 13 in the sleeve 12, with a space 27 situated under the piston head 25. A further space 28 is found located within the valve, upstream of the non-return valve 7.

The relief valve as described in the embodiment functions in the following manner. It is assumed that the piston rod 22, valve cone 23 and piston head 25 are in the starting position shown in the drawing, the valve cone 23 effectively sealing against the seating 24. This means that communication between the valve space 28 and the side outlet 6 is closed. Consequently the pumped pressure medium enters in the direction of arrow C and passes through the space 28, depresses the non-return valve 7 and flows out through the conduit 5 to the working machine, apparatus or the like, in the direction of arrow E. The valve can thus be set for a specific, maximum hydraulic pressure which, for instance, is adapted according to the work to be carried out in machines or apparatus connected thereto. Providing that this pressure is not exceeded downstream of the non-return valve 7 the piston rod 22 always adopts the position shown in the drawing. Should, however, a sudden rise in pressure occur, momentarily exceeding the maximum pressure established by the coil spring 17, downstream of the non-return valve the excess pressure will be propagated through the channel 26, the holes 13 and into the space 27, whereby the piston head 25, due to the excess pressure acting against the lower, annular pressure face of the piston head forces the piston upwardly in the direction of arrow A against the reaction of the spring force exerted by the spring 17, which acts through the medium of the abutment plate 16, directly against the piston. When this momentary lifting of the valve takes place, the valve cone 23 is also lifted from its seating 24 by a corresponding amount, whereby the pressure medium flowing in in the direction of arrow C passes through the side outlet 6 and out into, for instance, an overflow tank or the like, intended for oil or other types of pressure medium. While this is taking place the ball 7, owing to the excess pressure downstream of the non-return valve, is pressed strongly against its seating 9, whereby normally no pressure medium passes through the said non-return valve. Thus, the function of said non-return valve is to ensure that the pressure remains, in for instance, a working cylinder in the working machine until the pressure, by means of special operating means in the pressure circuit, is caused to drop, downstream of the non-return valve 7. This means that the pressure in the chamber 27 also falls, whereby the piston head 25 is immediately forced down by the spring 17. This in turn means that the valve cone 23 is again pressed into sealing engagement with the seating 24, after which the flow resumes its normal passage through the non-return valve 7 and out into the main flow conduit, in the direction of the arrow E. The pressure medium continues to flow along this course as long as the maximum pressure downstream of the non-return valve in the conduit 5 is not exceeded, when the same operation as described above is automatically effected by the piston rod 22.

It may also be mentioned that the effective piston area or annular surface 29 on the piston head 25 must be greater than the effective pressure area of the valve cone 23 or valve seating 24 since otherwise if these two areas were equal the two members would be balanced hydraulically, rendering it impossible to control the adjustment of the piston rod system. Further, the cross-sectional area of the piston rod 22 should be smaller than the effective area of the valve cone 23 and the effective pressure surface of the piston head 25.

The difference between the areas of the piston 25 and the cone 23, however, should not be unnecessarily great since the force of the spring 17 would then have to be very strong to hold the valve cone 23 closed, particularly at high pressure.

When the pressure in the spaces 28 and 27 is equal the piston 22 is in equilibrium, but as soon as the piston moves in the direction of arrow A and lifts the valve cone 23 from its seating the pressure in the space 28 falls and the spring presses the piston in the direction of arrow B, with a pressure corresponding to the excess pressure of the medium downstream of the non-return valve 7, multiplied by the difference in the effective pressure areas.

What is claimed is:

1. A hydraulic unloader valve comprising a valve housing having an inlet for a compressed fluid, and an outlet for said fluid, the outlet being connectable to a pressure system, a non-return valve seated in the path of the flowing fluid, said housing having a chamber which is isolated from the main flow of pressure fluid through the valve but which is in constant communication with the pressure system, and a by-pass outlet connected to the main flow path upstream of the non-return valve, a partition member which isolates the chamber from the said main flow, a valve stem slidably and sealingly passing through said partition member, a valve body on said stem for closing said by-pass outlet, a piston including a first portion in said chamber secured to said stem and a second portion external of the chamber, and adjustable spring means acting on said second portion of the piston with a regulable pre-set force, said valve body having a cross-sectional area which is less than that of the first portion of the piston, and the stem having a cross-sectional area less than that of said valve body.

References Cited

UNITED STATES PATENTS

| | | | |
|---|---|---|---|
| 2,086,295 | 7/1937 | Ernst | 137—108 XR |
| 2,183,889 | 12/1939 | Magnuson | 137—108 |
| 2,420,394 | 5/1947 | Gilman | 137—108 |
| 2,420,890 | 5/1947 | MacDuff | 137—108 |
| 3,140,722 | 7/1964 | Gordon | 137—108 |

JOHN PETRAKES, *Primary Examiner.*

U.S. Cl. X.R.

137—115, 116